Feb. 7, 1956          J. M. BLAKE II          2,733,954
CONVERTIBLE AUTOMOBILE TOP OF THE TELESCOPING TYPE
Filed March 20, 1953          2 Sheets-Sheet 1
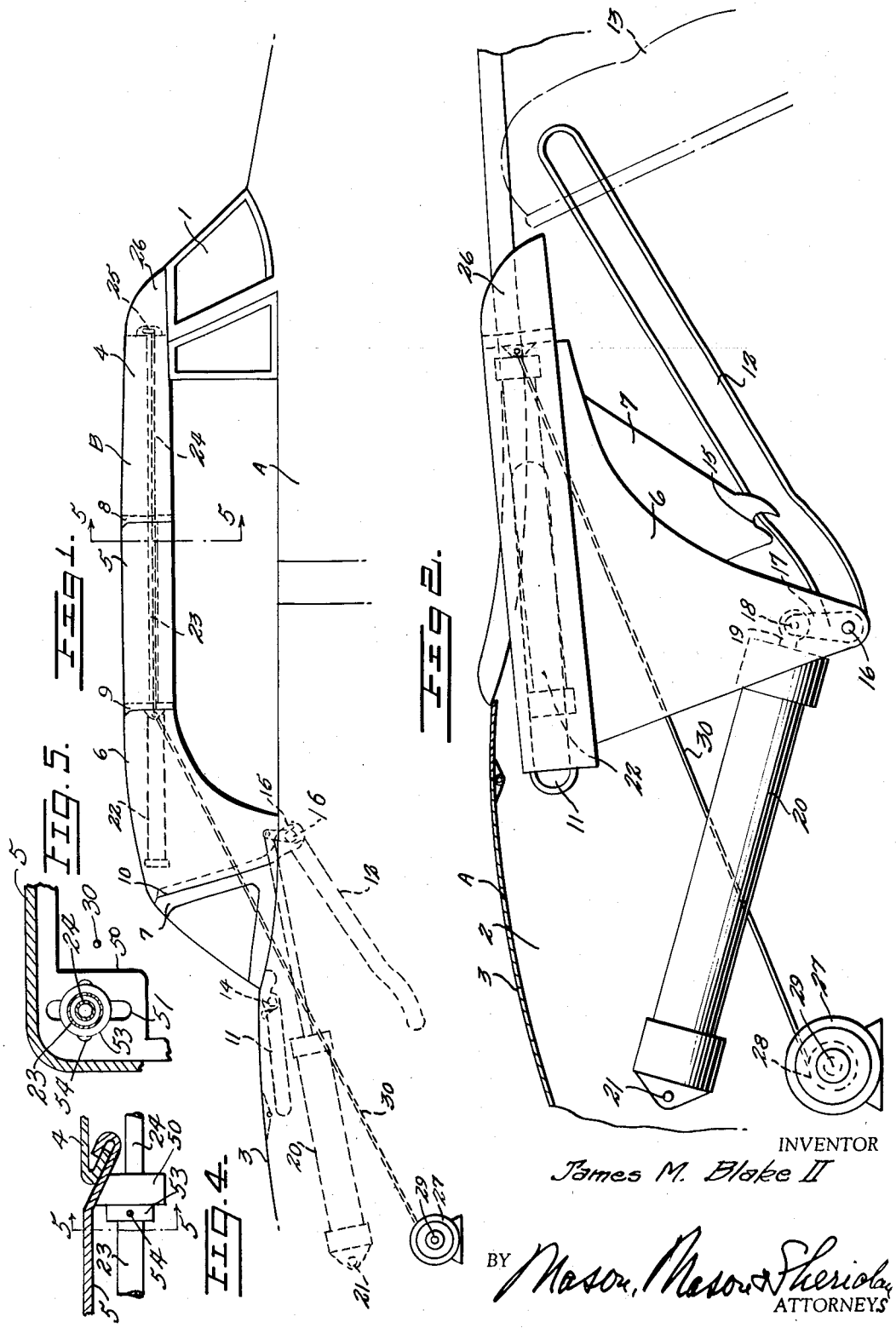
INVENTOR
James M. Blake II
BY Mason, Mason & Sheridan
ATTORNEYS Feb. 7, 1956        J. M. BLAKE II        2,733,954
CONVERTIBLE AUTOMOBILE TOP OF THE TELESCOPING TYPE
Filed March 20, 1953        2 Sheets-Sheet 2
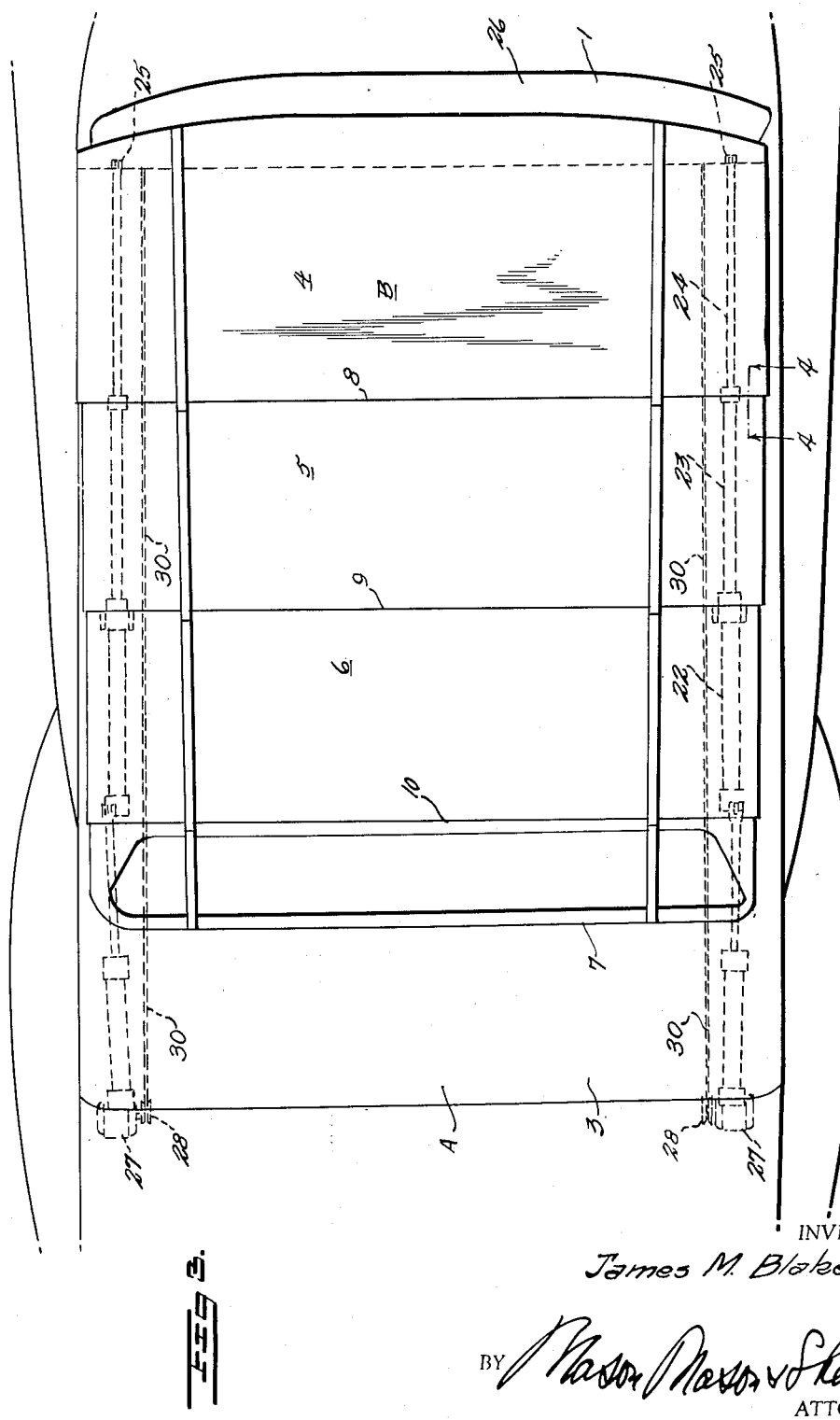
INVENTOR
James M. Blake II
BY *Mason, Mason & Sheridan*
ATTORNEYS United States Patent Office 2,733,954
Patented Feb. 7, 1956

2,733,954
CONVERTIBLE AUTOMOBILE TOP OF THE TELESCOPING TYPE

James M. Blake II, Baltimore, Md.

Application March 20, 1953, Serial No. 343,654

12 Claims. (Cl. 296—117)

This invention relates to an automobile top which employs a plurality of semi-rigid telescoping sections.

An object of the invention, therefore, is to provide a demountable top for an automobile having a minimum number of parts and which is not likely to get out of order.

A further object of the invention is to provide a collapsible top of the semi-rigid type comprising a plurality of sections with means for housing the sections within the automobile body.

An additional object of the invention is to provide novel means for raising and lowering the top.

Other objects will appear hereinafter throughout the specification.

In the drawings:

Figure 1 is a side elevation of the top in extended position and showing in dotted lines the mechanism for raising and lowering the same;

Figure 2 is an enlarged side elevation of the top in folded position and the raising and lowering mechanism;

Figure 3 is a top plan view of the top in extended position and some of the operating parts therefor;

Figure 4 is a section taken on the line 4—4 of Figure 3, showing a supporting means for a cylinder; and Figure 5 is a section taken on the line 5—5 of Figure 4.

Referring to the drawings, the letter A indicates the automobile body and B the top thereof.

The body is provided with a conventional windshield 1 and a luggage compartment or space in the back of the seat 2, having a top portion 3.

The top B consists of a plurality of telescoping sections comprising a forward section 4, an intermediate section 5, a rear section 6 and a back section 7. It will be understood that the number of sections may be varied, depending upon the type of car body to which it is attached. The juxtaposed leading and trailing edges of adjacent sections become interlocked with each other as indicated by numerals 8, 9 and 10, when in the position shown in Figures 1 and 3. This interlocking is effected due to the fact that the forward edges of sections 5, 6 and 7 and the rearward edges of sections 4, 5 and 6 are U-shaped in vertical cross section, the said rearward edges extending in a curve around and beneath its section, and the forward edges extending in a curve around and above its section. The entire forward and rearward edge surfaces become interlocked with each other one-by-one as the sections are forced into position as the top is moved from its "down" position to its "up" position by the mechanism now to be described. It will be understood that many of the parts of the operating mechanism shown in Figures 1 to 3 and as hereinafter described are duplicated in actual practice, one of each being shown for illustrative purposes only.

As seen in Figures 1 and 2, there is an upper channel 11 and a lower channel 12 located in the luggage compartment, or in lieu thereof in the space provided in the rear of the car seat 13. Back section 7 is provided with a pivot stud 14 which rides in slot 11, and with a hook-shaped recess 15 which is engaged by stud 16 that rides in slot 12. The said recess 15 becomes disengaged from stud 16 as the top nears the end of its closing movement, and as seen in Figure 2, is engaged by the stud during the top opening movement, and remains so engaged when the top is "open" as shown in Figure 1. The lower end of section 6 is rigidly attached to stud 16.

Stud 16 is splined to one end of a lever 17 whose opposite end is pivotally connected at 18 to a piston rod 19 of a fluid cylinder, such as air cylinder 20, whose opposite end is pivoted at 21 to a fixed part of the automobile body. Mounted on the underside of section 6 is a telescoping fluid cylinder means 22 which is preferably air operated. This means 22 consists of the outside cylinder, seen in dotted lines in Figures 1 and 3, an intermediate cylinder-piston member 23 and a forward piston member 24. These are telescopically connected to each other and each is connected to the section under which it lies. The forward end of piston 24 is pivotally connected at 25 to the front bow 26 forming the leading edge of section 4.

Mounted in the space 2 is a motor means, preferably an electric motor 27 having a reel 28 mounted on its shaft 29. Wound on the reel is a flexible cable or cord 30 that extends through suitable guides in sections 4, 5 and 6, not shown, and has its end fastened to forward bow 26.

It will be understood that the parts indicated by numerals 11 to 14, 16 to 25 and 27 to 30, each inclusive, are duplicated on opposite sides of the automobile.

Figures 4 and 5 illustrate a conventional means for mounting the pistons beneath the top sections so as to allow a certain amount of play between each piston and the top section on which it is mounted. Roof section 5 is provided with a hanger 50 having a slot 51 in which the next forward cylinder-piston 24 moves. The collar 53 is provided with a pin 54 which abuts against the hanger 50 and allows relative movement between each cylinder-piston and the roof section supported by its hanger. Other constructions may be used which will support each cylinder-piston and which will operate in a similar manner.

In order to move the top from its "down" to its "up" position, fluid such as air is forced into the rear end of cylinder 20 by conventional connections and conventional control mechanism, both not shown. This will cause the rear section 7 to slide and pivot on stud 14, and will cause stud 16 to engage in hook-shaped recess 15 and move section 7 to the position shown in Figure 1. At this time, sections 4, 5 and 6 are telescoped with each other as is the cylinder means 22. Studs 14 and 16 have now moved to the forward ends of their slots 11 and 12 respectively. This movement causes interlocking of sections 6 and 7, as section 6 moves upwardly slightly behind section 7 and about this time, recess 15 becomes seated on stud 16, which latter moves section 6 upwardly as guided by the movement of stud 16 in slot 12. Fluid, such as air, is now admitted to cylinder means 22, forcing sections 5 and 4 forward until the leading and rear edges of these sections and section 6 become interlocked with each other. The bow 26 of section 4 is then secured to the upper portion of the windshield by suitable conventional securing means, not shown, and the fluid pressure in cylinder 20 and cylinder means 22 may then be released.

In order to move the top from its "up" to its "down" position, the bow 26 is released from the windshield, and the electric motor is operated by an electrical switch (not shown), whereupon sections 4, 5 and 6 first become telescoped with each other successively, followed by disengagement of sections 6 and 7, and the subsequent movement of telescoped sections 4, 5 and 6 as guided by slot 12, and the sliding and rotational movements of section 7 as all sections enter recess 2. During this movement, recess or notch 15 of section 7 becomes disengaged from stud 16 as stud 14 slides to the rear end of slot 11.

While the device as shown and described herein is admirably adapted to fulfill the objects and features of advantage previously enumerated as desirable, it is to be understood that the invention is not to be limited to these specific features, but that the means and construction herein disclosed are susceptible of modification in form, proportion, and arrangement of parts without departing from the principle involved or sacrificing any of its advantages; and the invention is, therefore, claimed in embodiments of various forms, all coming within the scope of the claims which follow.

I claim:

1. In combination, an automobile body having a passenger compartment including a seat, a storage compartment located rearwardly of said seat; the combination with said body of a top comprising a plurality of sections comprising a forward, an intermediate, a rear, and a back section, guide means in said compartment for said rear and back sections, pairs of dual fluid means, one pair of said means connected at one end of each to a fixed portion of said compartment and at the opposite end of each to said rear section, operating means connecting one of each of the other pair of said means to the respective sections of the top on opposite sides thereof, said first pair of fluid means adapted to operatively engage said back section on opposite sides thereof subsequent to the initial extending movement to cause said sections to move forwardly from said storage compartment to an extended position and separate means for retracting said sections within said storage compartment.

2. In combination, an automobile body having a passenger compartment including a seat, a storage compartment located rearwardly of said seat; the combination with said body of a top comprising a plurality of sections comprising a forward, an intermediate, a rear, and a back section, guide means in said compartment for said rear and back sections, pairs of dual fluid means, one pair of said means connected at one end of each to a fixed portion of said compartment and at the opposite end of each to said rear section, operating means connecting one of each of the other pair of said means to the respective sections of the top on opposite sides thereof, said first pair of fluid means adapted to operatively engage said back section on opposite sides thereof subsequent to the initial extending movement to cause said sections to move forwardly from said storage compartment to an extended position and separate means including electric motor means for retracting said sections within said storage compartment, said pairs of dual fluid operating means comprising pairs of cylinders having pistons therein.

3. In combination, an automobile body having a passenger compartment including a seat, a storage compartment located rearwardly of said seat; the combination with said body of a top comprising a plurality of sections including a forward, a back, and a rear section, pairs of dual fluid means, one pair of said means connected at one end of each to a fixed portion of said compartment and at the opposite end of each to said rear section, operating means connecting one of each of the other pair of said means to the respective section of the top on opposite sides thereof, said first pair of fluid means adapted to operatively engage said back section on opposite sides thereof subsequent to the initial extending movement to cause said sections to move forwardly from said storage compartment to an extended position and separate means for retracting said sections within said storage compartment, said last-named means including an electric motor means and cable means operated by said motor means, said cable means being connected to said front section.

4. In combination, an automobile body having a passenger compartment including a seat, a storage compartment located rearwardly of said seat; the combination with said body of a top comprising a plurality of sections comprising a forward, an intermediate, a rear and a back section, means to cause said sections to move forwardly from said storage compartment, to an extended position and separate means for retracting said sections within said storage compartment, said last-named means including an electric motor means and cable means operated by said motor means, said cable means being connected to said front section, and means for guiding said sections to and from said compartment including two pairs of channels located in said compartment, one pair of said channels forming an acute angle with the other pair, said first named means comprising two pairs of cylinders, each pair having pistons, and one of each of one pair of cylinders being pivotally mounted on the opposite sides of said automobile body, one piston of each of said one pair of pistons on opposite sides of said body having means pivotally connecting the same to the rear section of said top, said connecting means being adapted to engage said back section during the extending operation of said top, but being disengaged when said top is in storage position.

5. In combination, an automobile body having a passenger compartment including a seat, a storage compartment located rearwardly of said seat; the combination with said body of a top comprising a plurality of sections comprising a forward, an intermediate, a rear and a back section, means to cause said sections to move forwardly from said storage compartment to an extended position and separate means for retracting said sections within said storage compartment, both of said means including a pair of channels on opposite sides of said storage compartment, a pair of studs movable in each of said pair of channels, one of said studs of each pair being mounted on said back section, said back section having a recess for engagement with and disengagement from the other of said studs of each pair during the movement of said back section into and out of said storage compartment, the latter studs being rigidly connected to said rear section.

6. In combination, an automobile body having a passenger compartment including a seat, a storage compartment located rearwardly of said seat; the combination with said body of a top comprising a plurality of sections comprising a forward, an intermediate, a rear and a back section, means to cause said sections to move forwardly from said storage compartment to an extended position and separate means for retracting said sections within said storage compartment, both of said means including a pair of channels on opposite sides of said storage compartment, a pair of studs movable in each of said pair of channels, one of said studs of each pair being mounted on said back section, said back section having a recess for engagement with and disengagement from the other of said studs of each pair during the movement of said back section into and out of said storage compartment, said rear section being attached to the other of said studs of each pair.

7. In combination, an automobile body having a passenger compartment including a seat, a storage compartment located rearwardly of said seat; the combination with said body of a top comprising a plurality of sections comprising a forward, an intermediate, a rear and a back section, means to cause said sections to move forwardly from said storage compartment to an extended position and separate means for retracting said sections within said storage compartment, both of said means including a pair of channels on opposite sides of said storage compartment, a pair of studs movable in each of said pair of channels, one of said studs of each pair being mounted on said back section, said back section having a recess for engagement with and disengagement from the other of said studs of each pair during the movement of said back section into and out of said storage compartment, the latter studs being rigidly connected to said rear section, said first-named means further including a pair of air cylinder means connected to the other of said studs of each pair for lifting the sections out of said storage compartment.

8. In combination, an automatic body having a passenger compartment including a seat, a storage compartment located rearwardly of said seat; the combination with said body of a top comprising a plurality of sections comprising a forward, an intermediate, a rear and a back section, means to cause said sections to move forwardly from said storage compartment to an extended position and separate means for retracting said sections within said storage compartment, both of said means including a pair of channels on opposite sides of said storage compartment, a pair of studs movable in each of said pair of channels, one of said studs of each pair being mounted on said back section, said back section having a recess for engagement with and disengagement from the other of said studs of each pair during the movement of said back section into and out of said storage compartment, said rear section being attached to the other of said studs of each pair, said first-named means further including a pair of air cylinder means connected to the other of said studs of each pair for lifting the sections out of said storage compartment.

9. In combination, an automobile body having a passenger compartment including a seat, a storage compartment located rearwardly of said seat; the combination with said body of a top comprising a plurality of sections comprising a forward, an intermediate, a rear and a back section, means to cause said sections to move forwardly from said storage compartment to an extended position and separate means for retracting said sections within said storage compartment, both of said means including a pair of channels on opposite sides of said storage compartment, a pair of studs movable in each of said pair of channels, one of said studs of each pair being mounted on said back section, said back section having a recess for engagement with and disengagement from the other of said studs of each pair during the movement of said back section into and out of said storage compartment, the latter studs being rigidly connected to said rear section, said first-named means further including a pair of air cylinder means connected to the other of said studs of each pair for lifting the sections out of said storage compartment, and a pair of other air cylinder means connected to and located beneath said forward, intermediate and rear sections and each comprising a plurality of cylinders and pistons adapted to telescope with each other.

10. In combination, an automobile body having a passenger compartment including a seat, a storage compartment located rearwardly of said seat; the combination with said body of a top comprising a plurality of sections comprising a forward, an intermediate, a rear and a back section, means to cause said sections to move forwardly from said storage compartment to an extended position and separate means for retracting said sections within said storage compartment, both of said means including a pair of channels on opposite sides of said storage compartment, a pair of studs movable in each of said pair of channels, one of said studs of each pair being mounted on said back section, said back section having a recess for engagement with and disengagement from the other of said studs of each pair during the movement of said back section into and out of said storage compartment, said rear section being attached to the other of said studs of each pair, said first-named means further including a pair of air cylinder means connected to the other of said studs of each pair for lifting the sections out of said storage compartment, and a pair of other air cylinder means connected to and located beneath said forward, intermediate and rear sections and each comprising a plurality of cylinders and pistons adapted to telescope with each other.

11. In combination, an automobile body having a passenger compartment including a seat, a storage compartment located rearwardly of said seat; the combination with said body of a top comprising a plurality of sections comprising a forward, an intermediate, a rear and a back section, means to cause said sections to move forwardly from said storage compartment to an extended position and separate means for retracting said sections within said storage compartment, both of said means including a pair of channels on opposite sides of said storage compartment, a pair of studs movable in each of said pair of channels, one of said studs of each pair being mounted on said back section, said back section having a recess for engagement with and disengagement from the other of said studs of each pair during the movement of said back section into and out of said storage compartment, the latter studs being rigidly connected to said rear section, said first-named means further including a pair of air cylinder means connected to the other of said studs of each pair for lifting the sections out of said storage compartment, and a pair of other air cylinder means connected to and located beneath said forward, intermediate and rear sections and each comprising a plurality of cylinders and pistons adapted to telescope with each other, said means for retracting said sections comprising a plurality of electric motors and cables connecting said motors to said forward section.

12. In combination, an automobile body having a passenger compartment including a seat, a storage compartment located rearwardly of said seat; the combination with said body of a top comprising a plurality of sections comprising a forward, an intermediate, a rear and a back section, means to cause said sections to move forwardly from said storage compartment to an extended position and separate means for retracting said sections within said storage compartment, both of said means including a pair of channels on opposite sides of said storage compartment, a pair of studs movable in each of said pair of channels, one of said studs of each pair being mounted on said back section, said back section having a recess for engagement with and disengagement from the other of said studs of each pair during the movement of said back section into and out of said storage compartment, said rear section being attached to the other of said studs of each pair, said first-named means further including a pair of air cylinder means connected to the other of said studs of each pair for lifting the sections out of said storage compartment, and a pair of other air cylinder means connected to and located beneath said forward, intermediate and rear sections and each comprising a plurality of cylinders and pistons adapted to telescope with each other, said means for retracting said sections comprising a plurality of electric motors and cables connecting said motors to said forward section.

References Cited in the file of this patent

UNITED STATES PATENTS

| | | |
|---|---|---|
| 1,226,079 | Kauffman | May 15, 1917 |
| 1,321,913 | Hedges | Nov. 18, 1919 |
| 2,045,344 | Deutsch et al. | June 23, 1936 |
| 2,406,737 | Bramble | Sept. 3, 1946 |
| 2,496,437 | Bramble | Feb. 7, 1950 |
| 2,632,670 | Crenshaw | Mar. 24, 1953 |